Patented Mar. 9, 1948

2,437,450

UNITED STATES PATENT OFFICE 2,437,450

AROMATIC MERCURY ALCOHOLATES

Carl N. Andersen, Pleasantville, N. Y., assignor, by mesne assignments, to Gallowhur Chemical Corporation, a corporation of New York No Drawing. Application April 14, 1945, Serial No. 588,417

19 Claims. (Cl. 260—410.5)

1

This invention relates to new chemical compounds which are characterized by being partial aryl mercuric alcoholates and partial carboxylic esters of polyhydroxy organic compounds. They are also characterized by possessing, among other desirable properties, extraordinarily high potency as antiseptics and germicides and at the same time, relatively low toxicity. They are also characterized by solubility in organic solvents and oils.

The substance of the invention falls within the scope of the general formula $(RHg)_xR_1$ wherein R represents an aromatic structure to a carbon atom of which the mercury is directly attached; $R_1$ represents a residue of a polyhydroxy organic compound containing at least one ester group, which residue is linked to the RHg group, or groups, through the replacement of the hydrogen atom of a hydroxyl group, or groups, and $x$ is a small whole number. While the word "group" is used hereinafter, it is obvious that it is to be understood as plural where the value of $x$ is more than one.

More particularly, R represents an aromatic structure, which may be an aromatic nucleus with or without side chains and the expression "aromatic structure" used herein is intended to be generic and including aromatic nucleus with or without side chains. The aromatic structure is one of the type in which none of the nuclear or side chain carbon atoms has direct linkage with any element other than hydrogen, carbon, or mercury. R may stand for the phenyl group $C_6H_5$, or for an aromatic hydrocarbon having a nuclear similar to the phenyl hydrocarbon, as for example polycyclic, in which all of the nuclear carbon atoms, other than the one attached to mercury, and any side chain carbon atoms have their valences satisfied either by carbon or hydrogen. Examples are the diphenyl, tolyl, xylyl and naphthyl groups.

The radical $R_1$ represents a radical corresponding to polyhydroxy organic compounds which contain two or more hydroxyl groups, at least one of these hydroxyl groups being unsubstituted and attached to mercury by replacement of the hydrogen thereof and at least one of these hydroxyls being substituted by an acyl group. The nature of the radical may be varied. It may have any number of elements and any number of hetero atoms. It may contain aromatic or heterocyclic compounds. The hetero atom, or atoms, may be any of the elements ordinarily found in hetero compounds.

More limited aspects of the compounds of the invention may be represented by the following general formulae in which Y is an organic radical preferably a saturated or an unsaturated aliphatic radical, R is an aromatic structure as defined above.

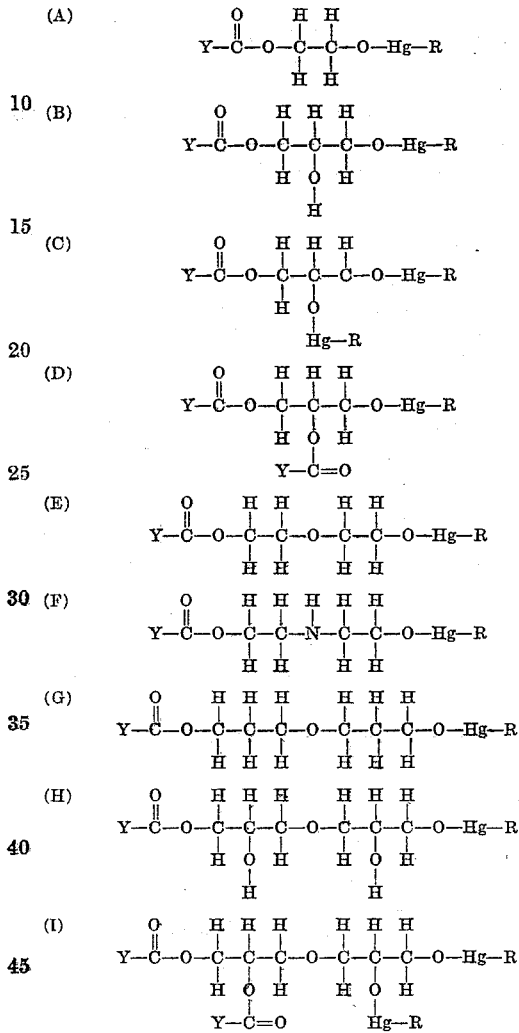

Specific representative compounds which fall within the scope of the invention are typified by compounds of the following formulae:

(1)
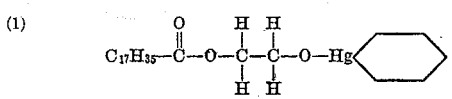

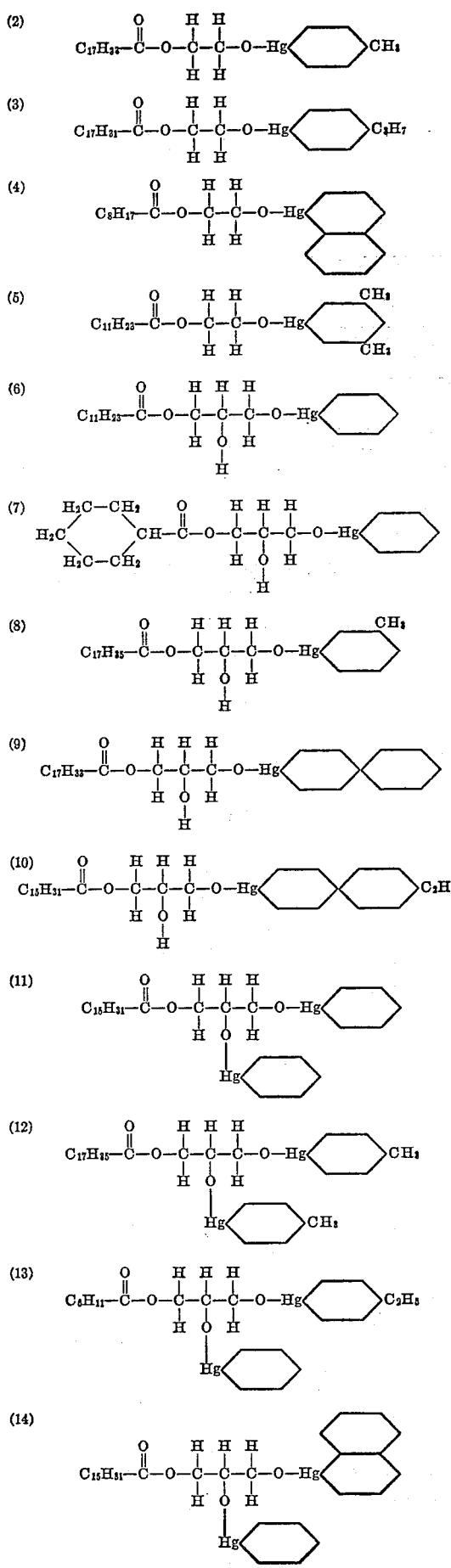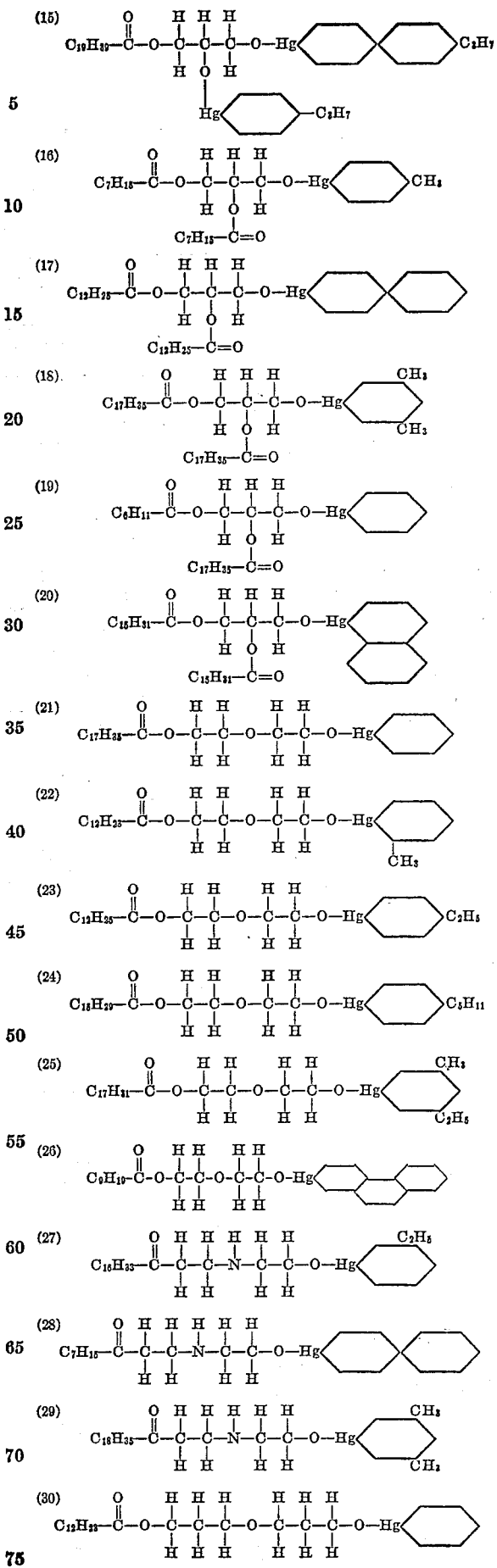

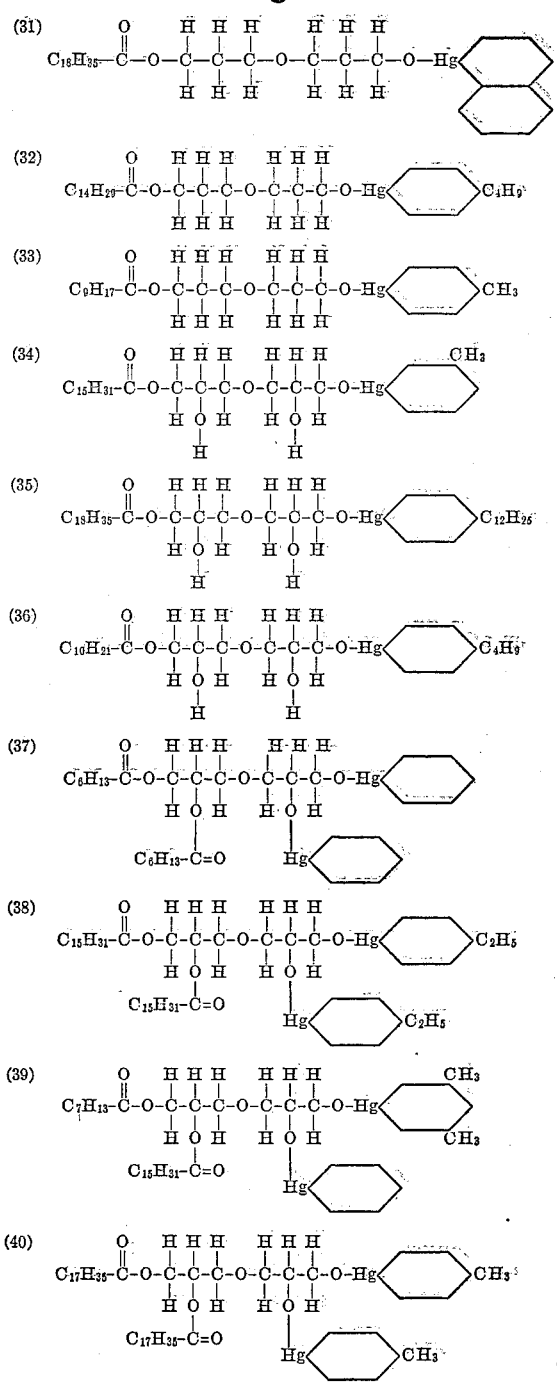

The foregoing specific compounds are included in order to aid in the understanding of the invention, and are not to be construed as limitations of the invention as otherwise disclosed herein.

Any of the above compounds can be prepared by the general methods to be described hereinafter. The organic mercury compounds that have been prepared and tested justify the conclusion that all of the compounds of the invention have, in greater or lesser, but always in relatively high degree, desirable antiseptic and germicidal properties. The invention, therefore, is regarded as generic to and including aromatic mercury alcoholates of partially esterified polyhydroxy organic compounds.

The aromatic mercury alcoholate compounds of the invention are soluble in oils such as fatty oils and also in hydrocarbon oil solvents. They are also soluble in esters, ethers, halogenated aromatic solvents, oils and the like.

The general method of producing these compounds consists in reacting together a partially esterified polyhydroxy organic compound containing at least one free hydroxyl hydrogen with a compound containing an aromatic mercury radical of the above mentioned type. A common solvent for both reacting compounds may be employed. The compound resulting from the reaction is usually relatively insoluble, as compared with the reacting components, and upon its precipitation, may be filtered, washed and dried. As a compound containing an aromatic mercury radical, an aromatic mercury hydroxide, or a soluble aromatic mercury salt, such as the lactate or acetate, may be used. The aromatic mercury compounds produced are of relatively low solubility, as compared with the aromatic mercury hydroxide or salt. In this reaction the structure of the polyhydroxy residue is not disturbed and it remains intact except for the replacement of the hydroxyl hydrogen.

The following examples are given as illustrative of methods by which the compounds of the invention may be prepared and also as illustrative of representative organic mercury compounds falling within the scope of the invention. All representative, specific compounds mentioned herein are in no wise to be construed, however, as limitations on the invention as otherwise disclosed herein.

*Example 1*

29.4 grams of phenyl mercury hydroxide was dissolved in 500 cc. of ethyl alcohol. When solution was complete, the material was filtered; a solution of 35.8 grams of glyceryl monostearate dissolved in ethyl alcohol was added to the filtrate. The mass was agitated; a white precipitate resulted. After recrystallizing from ethyl alcohol three times, the product melted at 73–75° C. It was phenyl mercury mono-alcoholate of glyceryl mono-stearate

Phenyl mercury stearate, which is a compound which might be confused with those of my invention, has a melting point of 92–93° C. When a mixed melting point was taken of phenyl mercury stearate and the above mono-alcoholate of phenyl mercury glyceryl stearate, the mixed material melted at 60–61° C. This clearly shows that the new material did not contain or consist of phenyl mercury stearate.

Analysis of product: $C_{27}H_{46}O_4Hg$:

|   | Theoretical | Found |
|---|---|---|
|   | Per cent | Per cent |
| C | 51.10 | 50.79 |
| H | 7.25 | 7.20 |
| Hg | 31.54 | 33.94 |

The phenyl mercury mono-alcoholate of glyceryl mono-stearate was tested and found to be soluble in a wide variety of substances, among which are:

| | |
|---|---|
| Amyl acetate | Linoleic acid |
| Butyl acetate | Sulfonated mineral oil |
| Butyl lactate | Stoddart's solvent |
| Monochlorobenzene | Cottonseed oil |
| Castor oil | Olive oil |
| Carbon tetrachloride | Linseed oil |
| Dioxane | Soya bean oil |
| Dibutyl phthalate | Turkey red oil |

Example 2

29.4 grams of phenyl mercury hydroxide was dissolved in 500 cc. of ethyl alcohol, and after 15 minutes of heating, the mixture was filtered; an ethanol solution of 35.6 grams of glyceryl mono-oleate was added to the filtrate. No precipitate formed on the mixing of the two compounds, but on cooling, a semi-waxy material separated. After recrystallization from alcohol three times, it melted at 49–50° C. It was phenyl mercury mono-alcoholate of glyceryl mono-oleate.

Example 3

29.4 grams of phenyl mercury hydroxide was dissolved in 400 cc. of ethyl alcohol and heated until solution was complete. The mixture was filtered; an alcohol solution of 25.8 grams of propylene glycol mono-laurate was added to the filtrate. On standing the material crystallized from the mother liquor; after recrystallization from alcohol, the product melted at 50° C. It was phenyl mercury alcoholate of propylene glycol mono-laurate, which has the formula:

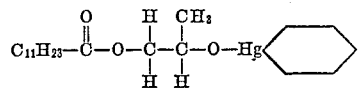

Example 4

58.8 grams of phenyl mercury hydroxide was dissolved in 600 cc. of ethyl alcohol and heated until solution was complete, after which time it was filtered. An ethyl alcohol solution of 62 grams of glyceryl dioleate, dissolved in 200 cc. of the alcohol, was added to the filtrate. On cooling, a white crystalline precipitate formed. After recrystallization from alcohol the product melted at 71° C. It was phenyl mercury alcoholate of glyceryl dioleate.

Example 5

29.4 grams of phenyl mercury hydroxide was dissolved in 200 cc. of alcohol, heated to boiling and filtered; an alcohol solution of 42.2 grams of polyglyceryl laurate was added to the filtrate. The mixture was heated and refluxed for 5 minutes, to insure completion of the reaction, and allowed to cool. No precipitate separated out of the hot solution, but on cooling, a white solid separated. It melted at 30° C. It was phenyl mercury alcoholate of polyglyceryl laurate.

Following the procedure of Example 5, the corresponding palmitate and stearate were prepared. The palmitate melted at 58° C., and the stearate at 62° C.

The reacting materials are employed in substantially theoretical quantities. In some cases, if desired, about 10% excess of the partially esterified polyhydroxy organic compound may be employed, in order to insure the complete conversion of the phenyl-mercury compound.

Any suitable solvent in which the reacting components are soluble may be used as the medium for carrying out the reaction. If they are both soluble in water, this would generally be used for reasons of convenience, but if not, other solvents such as the alcohols or ketones or mixtures of these with each other, or with water, may be employed. The process may be carried out at any temperature, for example, room temperature. In most cases it is found, however, that the application of heat facilitates the solution of the reacting components and speeds the reaction.

All of the compounds produced as above described are characterized by extraordinarily high potency as germicides and fungicides. Tests to determine their efficacy were made as follows:

13.85 grams of phenyl mercury alcoholate of glyceryl dioleate was dissolved in 86.15 grams of butyl acetate. One gram of this material was dissolved in 99 grams of isopropyl alcohol. Strips of 8-ounce army duck were immersed in the solution and tested. The following results were obtained when tested against *Staphylococcus aureus* by the F. D. A. method:

| Run No. | Per cent Compound deposited on the cloth (by weight) | F. D. A. Halos | | |
|---|---|---|---|---|
| | | Unleached | 3-hr. Spray Leached | 8-hr. Spray Leached |
| | Per cent | Mm. | Mm. | Mm. |
| 1 | 1.0 | 37 | 35 | 32 |
| 2 | 0.67 | 38 | 37 | 32 |

Both of these samples after being subjected to the regular 3-hour spray passed the standard *Chaetomium globosum* and *Aspergilus niger* tests.

17.20 grams of the phenyl mercury alcoholate of polyglyceryl palmitate was dissolved in 82.2 grams of butyl acetate. This solution was further diluted. The final liquid composition consisted of:

| | Grams |
|---|---|
| Isopropyl alcohol | 30 |
| Butyl acetate | 20 |
| Water | 49 |
| Phenyl mercury alcoholate of polyglyceryl palmitate solution (above) | 1 |

The strips of 8-ounce army duck were treated with this solution and tested. The following results were obtained:

| Run No. | Per cent Compound deposited on the cloth (by weight) | F. D. A. Halos | | |
|---|---|---|---|---|
| | | Unleached | 3-hr. Spray Leached | 8-hr. Spray Leached |
| | Per cent | Mm. | Mm. | Mm. |
| 1 | 1.07 | 37 | 35 | 32 |
| 2 | 0.69 | 36 | 35 | 35 |
| 3 | 0.24 | 33 | 31 | 26 |

Each of these three pieces of cloth, which vary from 1.07%–0.24%, passed the standard *Chaetomium globosum* and *Aspergilus niger* tests after being subjected to the regular 3-hour spray.

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally, and in some case administered internally with satisfactory results from the germicidal standpoint, and without harmful effect to the body or its functions.

In view of the foregoing, variations or modifications will be apparent to one skilled in the art. The invention includes all such modifications and variations as fall within the scope of the appended claims.

I claim:

1. A compound of the general formula $$(RHg)_xR_1$$

in which R represents an aromatic structure to a carbon atom of which the mercury is directly attached and in which none of the carbon atoms has direct linkage with any element other than hydrogen, carbon and mercury, in which $x$ is a small whole number, and in which $R_1$ represents an oxygenated organic radical containing at least one acyl group attached thereto through an oxygen in an ester linkage, which radical is linked to the RHg group through the replacement of an hydroxyl hydrogen atom.

2. A compound of the general formula $$(RHg)_xR_1$$

in which R represents a monocyclic aromatic structure to a carbon atom of which the mercury is directly attached and in which none of the carbon atoms has direct linkage with any element other than hydrogen, carbon and mercury, in which $x$ is a small whole number, and in which $R_1$ represents an oxygenated organic radical containing at least one acyl group attached thereto through an oxygen in an ester linkage, which radical is linked to the RHg group through the replacement of an hydroxyl hydrogen atom.

3. A compound of the general formula $$(RHg)_xR_1$$

in which R represents an aromatic structure to a carbon atom of which the mercury is directly attached and in which none of the carbon atoms has direct linkage with any element other than hydrogen, carbon and mercury, in which $x$ is a small whole number, and in which $R_1$ represents an aliphatic oxygenated organic radical containing at least one acyl group attached thereto through an oxygen in an ester linkage, which radical is linked to the RHg group through the replacement of an hydroxyl hydrogen atom.

4. A compound of the general formula $$(RHg)_xR_1$$

in which R represents an aromatic structure to a carbon atom of which the mercury is directly attached and in which none of the carbon atoms has direct linkage with any element other than hydrogen, carbon and mercury, in which $x$ is a small whole number, and in which $R_1$ represents an aliphatic acyclic oxygenated organic radical containing at least one acyl group attached thereto through an oxygen in an ester linkage, which radical is linked to the RHg group through the replacement of an hydroxyl hydrogen atom.

5. A compound of the general formula $RHgR_1$, in which R represents an aromatic structure to a carbon atom of which the mercury is directly attached and in which none of the carbon atoms has direct linkage with any element other than hydrogen, carbon and mercury, and in which $R_1$ represents an oxygenated organic radical containing at least one higher fatty acyl group attached thereto through an oxygen in an ester linkage, which radical is linked to the RHg group through the replacement of an hydroxyl hydrogen atom.

6. A compound of the general formula $RHgR_1$, in which R represents a monocyclic aromatic structure to a carbon atom of which the mercury is directly attached and in which none of the carbon atoms has direct linkage with any element other than hydrogen, carbon and mercury, and in which $R_1$ represents an aliphatic oxygenated organic radical containing at least one acyl group attached thereto through an oxygen in an ester linkage, which radical is linked to the RHg group through the replacement of an hydroxyl hydrogen atom.

7. A compound of the general formula $RHgR_1$, in which R represents a monocyclic aromatic structure to a carbon atom of which the mercury is directly attached and in which none of the carbon atoms has direct linkage with any element other than hydrogen, carbon and mercury, and in which $R_1$ represents an aliphatic acyclic oxygenated organic radical containing at least one acyl group attached thereto through an oxygen in an ester linkage, which radical is linked to the RHg group through the replacement of an hydroxyl hydrogen atom.

8. A compound of the general formula $RHgR_1$, in which R represents a monocyclic aromatic structure to a carbon atom of which the mercury is directly attached and in which none of the carbon atoms has direct linkage with any element other than hydrogen, carbon and mercury, and in which $R_1$ represents an aliphatic acyclic oxygenated organic radical containing at least one higher fatty acyl group attached thereto through an oxygen in an ester linkage, which radical is linked to the RHg group through the replacement of an hydroxy hydrogen atom.

9. A compound of the general formula $RHgR_1$, in which R represents a phenyl radical, and in which $R_1$ represents an oxygenated organic radical containing at least one acyl group attached thereto through an oxygen in an ester linkage, which radical is linked to the RHg group through the replacement of an hydroxyl hydrogen atom.

10. A compound of the general formula $(RHg)_xR_1$, in which R represents a phenyl radical, in which $x$ is a small whole number, and in which $R_1$ represents an oxygenated organic radical containing a glyceryl carbon and oxygen skeleton and containing at least one acyl group attached thereto through an oxygen in an ester linkage, which radical is linked to the RHg group through the replacement of an hydroxyl hydrogen atom.

11. A compound of the general formula $RHgR_1$, in which R represents a phenyl radical, and in which $R_1$ represents an oxygenated organic radical containing a glycol carbon and oxygen skeleton and containing at least one acyl group attached thereto through an oxygen in an ester linkage, which radical is linked to the RHg group through the replacement of an hydroxyl hydrogen atom.

12. A compound of the general formula $(RHg)_xR_1$, in which R represents a phenyl radical, in which $x$ is a small whole number, and in which $R_1$ represents an oxygenated organic radical containing a glyceryl carbon and oxygen skeleton and containing at least one higher fatty acyl group attached thereto through an oxygen in an ester linkage, which radical is linked to the RHg group through the replacement of an hydroxyl hydrogen atom.

13. A compound of the general formula $(RHg)_xR_1$, in which R represents an aromatic structure to a carbon atom of which the mercury is directly attached and in which none of the carbon atoms has direct linkage with any element other than hydrogen, carbon and mercury, in which $x$ is a small whole number, and in which $R_1$ represents an oxygenated organic radical containing a glyceryl carbon and oxygen skeleton and containing at least one acyl group attached thereto through an oxygen in an ester linkage, which radical is linked to the RHg group through the replacement of an hydroxyl hydrogen atom.

14. A compound of the general formula $RHgR_1$, in which R represents an aromatic structure to a carbon atom of which the mercury is directly attached and in which none of the carbon atoms has direct linkage with any element other than hydrogen, carbon and mercury, and in which $R_1$ represents an oxygenated organic radical containing a glycol carbon and oxygen skeleton and containing at least one acyl group attached thereto through an oxygen in an ester linkage which radical is linked to the RHg group through the replacement of an hydroxyl hydrogen atom.

15. A compound of the general formula $(RHg)_xR_1$, in which R represents an aromatic structure to a carbon atom of which the mercury is directly attached and in which none of the carbon atoms has direct linkage with any element other than hydrogen, carbon and mercury, in which $x$ is a small whole number, and in which $R_1$ represents an oxygenated organic radical containing a glyceryl carbon and oxygen skeleton and containing at least one higher fatty acyl group attached thereto through an oxygen in an ester linkage, which radical is linked to the RHg group through the replacement of an hydroxyl hydrogen atom.

16. A compound of the general formula $RHgR_1$, in which R represents an aromatic structure to a carbon atom of which the mercury is directly attached and in which none of the carbon atoms has direct linkage with any element other than hydrogen, carbon and mercury, and in which $R_1$ represents an oxygenated organic radical containing a glycol carbon and oxygen skeleton and containing at least one higher fatty acyl group attached thereto through an oxygen in an ester linkage, which radical is linked to the RHg group through the replacement of an hydroxyl hydrogen atom.

17. As a new organic compound, monophenyl-mercury alcoholate of glyceryl-mono-stearate.

18. As a new organic compound, phenyl-mercury alcoholate of propylene glycol-mono-laurate.

19. As a new organic compound, phenyl-mercury alcoholate of glycerol dioleate.

CARL N. ANDERSEN.

REFERENCES CITED

The following references are of record in the file of this patent:

UNITED STATES PATENTS

| Number | Name | Date |
|---|---|---|
| 2,056,945 | Andersen | Oct. 13, 1936 |
| 2,114,012 | Andersen | Apr. 12, 1938 |